US012689140B2

(12) United States Patent
Nottelmann et al.

(10) Patent No.: US 12,689,140 B2
(45) Date of Patent: Jul. 21, 2026

(54) PRESS-FIT CONNECTOR AND RECEPTACLE

(71) Applicant: Infineon Technologies AG, Neubiberg (DE)

(72) Inventors: Regina Nottelmann, Bad Sassendorf (DE); Alexander Herbrandt, Soest (DE)

(73) Assignee: Infineon Technologies AG, Neubiberg (DE)

( * ) Notice: Subject to any disclaimer, the term of this patent is extended or adjusted under 35 U.S.C. 154(b) by 388 days.

(21) Appl. No.: 17/875,878

(22) Filed: Jul. 28, 2022

(65) Prior Publication Data

US 2024/0039189 A1 Feb. 1, 2024

(51) Int. Cl.
*H01R 12/58* (2011.01)
*H01R 12/70* (2011.01)

(52) U.S. Cl.
CPC ....... *H01R 12/585* (2013.01); *H01R 12/7064* (2013.01)

(58) Field of Classification Search
CPC .............. H01R 12/585; H01R 12/7064; H01R 13/639; H01R 13/516; H01L 25/072; H01L 23/49811; H01L 23/3735; H01L 23/4334; H01L 23/498; H05K 3/30
See application file for complete search history.

(56) References Cited

U.S. PATENT DOCUMENTS

| | | | | |
|---|---|---|---|---|
| 5,752,839 A * | 5/1998 | Fiacco | H01R 24/50 439/78 |
| 7,816,781 B2 | 10/2010 | Thoben et al. | |
| 2016/0322287 A1* | 11/2016 | Nishizawa | H10W 90/701 |
| 2021/0305144 A1* | 9/2021 | Nogawa | H10W 42/121 |
| 2022/0102227 A1* | 3/2022 | Cardi | H01L 23/40 |
| 2022/0108939 A1* | 4/2022 | Minotti | H10W 72/50 |

FOREIGN PATENT DOCUMENTS

EP 3982401 A1 4/2022

* cited by examiner

*Primary Examiner* — Tulsidas C Patel
*Assistant Examiner* — Carlos E Lopez-Pagan
(74) *Attorney, Agent, or Firm* — Murphy, Bilak & Homiller, PLLC

(57) ABSTRACT

A semiconductor device includes an electronics carrier, an electrically conductive receptacle attached to a first pad of the electronics carrier, and an electrically conductive press-fit connector including a flange and a base portion extending from the flange to a first end of the press-fit connector, wherein the press-fit connector is in a secured position whereby the base portion is disposed within and securely retained by the receptacle, and wherein the base portion of the press-fit connector is configured to maintain vertical separation between the flange and an upper end of the receptacle in the secured position.

20 Claims, 5 Drawing Sheets

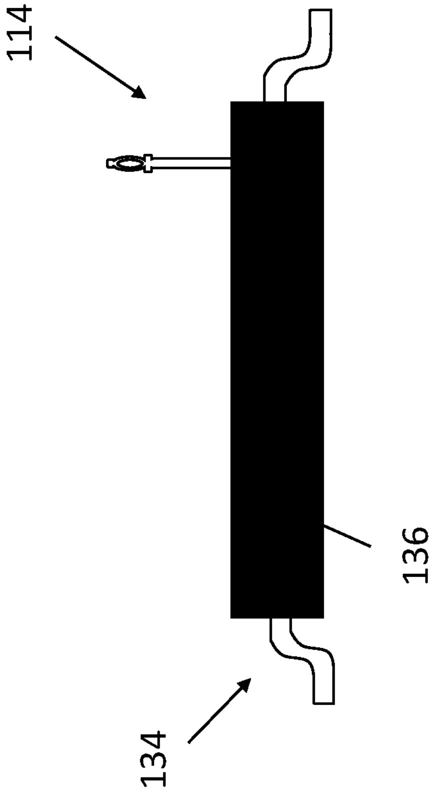
FIG. 5B
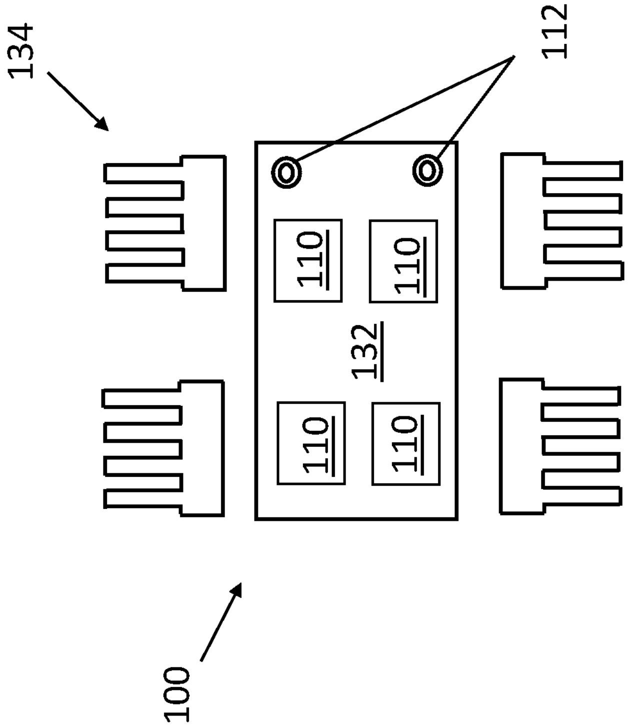
FIG. 5A
FIGURE 5

PRESS-FIT CONNECTOR AND RECEPTACLE

BACKGROUND

Semiconductor power modules are used in a wide variety of applications such as automotive, industrial motor drives, AC-DC power supplies, etc. Semiconductor power modules typically include multiple power semiconductor devices, e.g., power MOSFETs (metal-oxide semiconductor field-effect transistor), IGBTs (insulated gate bipolar transistors), HEMT (high electron mobility transistors), etc., along with other elements such as passive components, bond wires, etc., mounted on a common substrate. The electrical interconnections of semiconductor power modules must withstand large amounts of current, voltage and heat.

It would be desirable to produce a produce a semiconductor power module at lower cost with similar or better performance characteristics than conventional solutions.

SUMMARY

A semiconductor device assembly is disclosed. According to an embodiment, the semiconductor device comprises an electronics carrier, an electrically conductive receptacle attached to a first pad of the electronics carrier, and an electrically conductive press-fit connector comprising a flange and a base portion extending from the flange to a first end of the press-fit connector, wherein the press-fit connector is in a secured position whereby the base portion is disposed within and securely retained by the receptacle, and wherein the base portion of the press-fit connector is configured to maintain vertical separation between the flange and an upper end of the receptacle in the secured position.

Separately or in combination, the receptacle comprises a sleeve mechanically and electrically connected to an upper surface of the first pad, and wherein the base portion of the press-fit connector is configured maintain the vertical separation by a friction fit with the sleeve.

Separately or in combination, the base portion has a first diameter, and wherein the first diameter is equal to or greater than a minimum diameter of the sleeve.

Separately or in combination, the receptacle has a cylindrical geometry, and wherein the base portion has a polygonal geometry, and wherein edges of the base portion engage with the sleeve to provide the friction fit.

Separately or in combination, the electronics carrier comprises a structured metallization layer, and wherein the structured metallization layer comprises the first pad.

Separately or in combination, the electronics carrier comprises an electrically conductive lead frame, the lead frame further comprising the first pad.

Separately or in combination, the vertical separation distance between the flange and the upper end of the receptacle in the secured position is between 50 μm and 500 μm.

Separately or in combination, the vertical separation distance between the flange and the upper end of the receptacle in the secured position is between 200 μm and 300 μm.

Separately or in combination, a ratio between the vertical separation distance and the overall height of the receptacle is between 100:1 and 5:1.

Separately or in combination, the ratio between the vertical separation distance and the overall height of the receptacle is between 25:2 and 25:3.

Separately or in combination, the semiconductor device assembly further comprises a first semiconductor die mounted on the electronics carrier, wherein the press-fit connector is electrically connected to a terminal of the first semiconductor die via the receptacle and the first pad of the structured metallization layer.

Separately or in combination, the first semiconductor die is a power device, and wherein the electronics carrier is any one of: a DCB substrate, an IMS substrate, or an AMB substrate.

An electronics carrier interconnection system is disclosed. According to an embodiment, the electronics carrier interconnection system comprises an electrically conductive receptacle that is configured to be affixed to an electronics carrier, an electrically conductive press-fit connector comprising a flange and a base portion extending from the flange to a first end of the press-fit connector, wherein the press-fit connector is configured to be mechanically and electrically connected to the receptacle in a secured position whereby the base portion is disposed within and securely retained by the receptacle, and wherein the base portion of the press-fit connector is configured to maintain vertical separation between the flange and an upper end of the receptacle in the secured position.

Separately or in combination, the base portion that has a first diameter, and wherein the first diameter is equal to or greater than a minimum diameter of the sleeve.

Separately or in combination, the receptacle has a cylindrical geometry, and wherein the base portion has a polygonal geometry, and wherein edges of the base portion engage with the sleeve to provide the friction fit.

Separately or in combination, the vertical separation distance between the flange and the upper end of the receptacle in the secured position is between 50 μm and 500 μm.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 1A illustrates a plan-view of the electronics carrier with receptacles disposed thereon; and FIG. 1B illustrates a side-view of the electronics carrier with the press-fit connectors secured within the receptacles.

FIG. 2A illustrates a side-view of the receptacle; FIG. 2B illustrates a side-view of the receptacle and a lower part of the press-fit connector before insertion; and FIG. 2C illustrates a side-view of the receptacle and a lower part of the press-fit connector after insertion.

FIG. 5, which includes FIGS. 5A, and 5B, illustrates a semiconductor device assembly comprising an electronics carrier that is configured as a lead frame, electrically conductive receptacles, and electrically conductive press-fit connectors, according to an embodiment. FIG. 5A illustrates the semiconductor device assembly before encapsulation and FIG. 5B illustrates the semiconductor device assembly after encapsulation.

DETAILED DESCRIPTION

A semiconductor device assembly comprising an electronics carrier with a receptacle and a press-fit connector that is configured to be inserted into the receptacle are described herein. The press-fit connector comprises a flange and a base portion extending from the flange to a first end of the press-fit connector. The press-fit connector is secured to the receptacle by inserting the base portion into the receptacle. Advantageously, the base portion of the press-fit connector is configured to maintain vertical separation between the flange and an upper end of the receptacle in the secured position. Thus, the flange is prevented from contacting the upper end of the receptacle when the press-fit connector is inserted into the receptacle. Among other things, this improves the assembly because the engagement between the stopping feature and the receptacle stabilizes the position of the press-fit connector and because the machine tolerances for forming the stopping feature minimizes deviation in the height of the press-fit connector.

Figures 1, 1A, 1B:
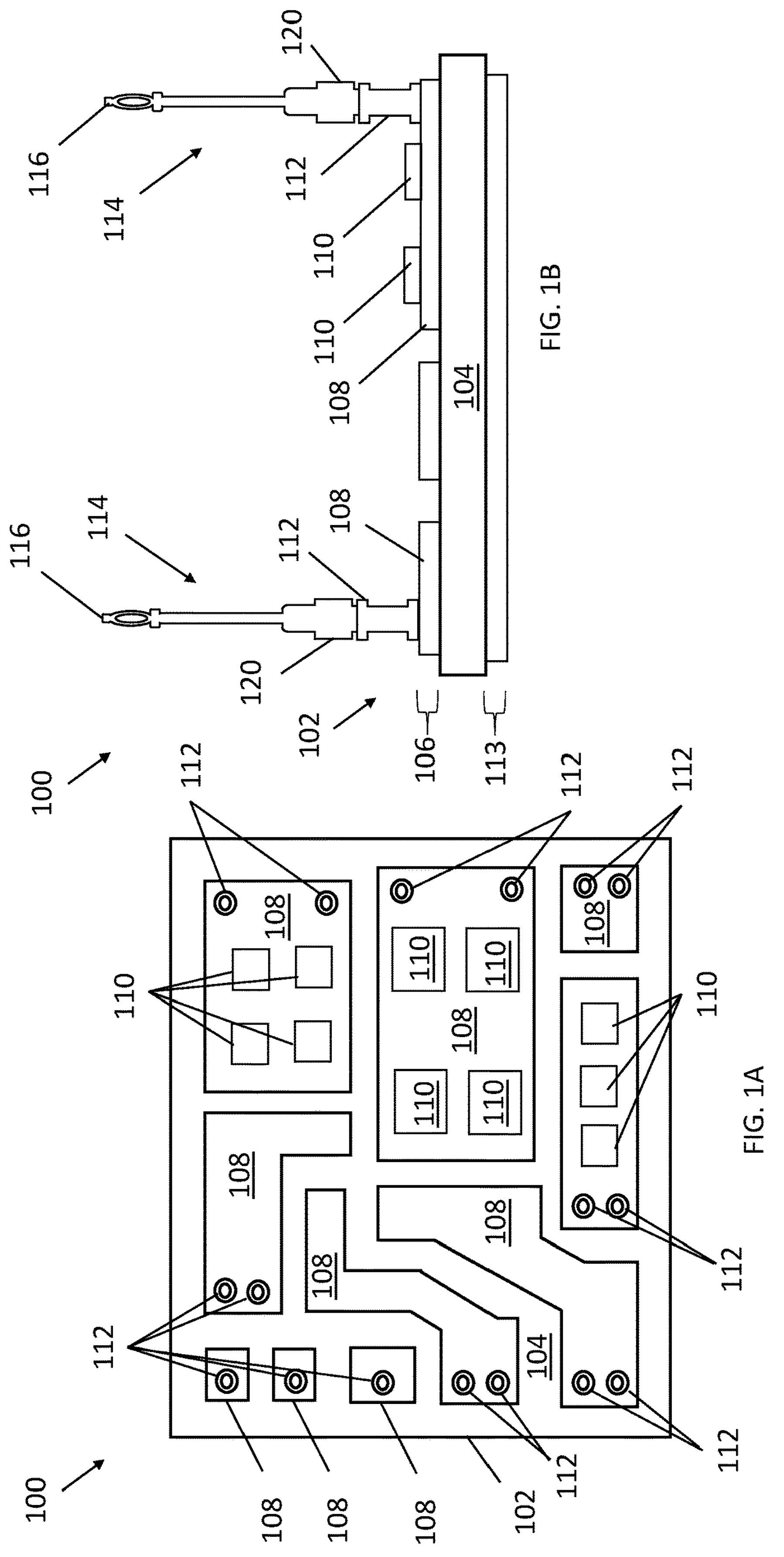
FIG. 1, which includes
FIGS. 1A and 1B, illustrates semiconductor device assembly comprising an electronics carrier, electrically conductive receptacles, and electrically conductive press-fit connectors, according to an embodiment.

Referring to FIG. 1, a semiconductor device assembly 100 comprises an electronics carrier 102. The electronics carrier 102 is a substrate that is configured to accommodate the mounting of multiple power semiconductor devices thereon. The electronics carrier 102 may be a DBC (direct bonded copper) substrate, an AMB (active metal brazed) substrate, an IMS (insulated metal substrate) a PCB (printed circuit board), for example, or a metal lead frame, for example.

The electronics carrier 102 comprises at least one dielectric layer 104. Generally speaking, the dielectric layer 104 can include any of a wide variety of electrically insulating materials such as ceramics, plastics, laminates, etc. More particularly, the dielectric layer 104 may include a ceramic material such as $Al_2O_3$(Alumina) AlN (Aluminium Nitride), etc., e.g., in the case of a DBC, AMB or IMS substrate, and may include pre-peg materials (pre impregnated fibre) such as FR-2, FR-4, CEM-1, G-10, etc., e.g., in the case of a PCB.

The electronics carrier 102 comprises a first structured metallization layer 106 disposed on a main side of the electronics carrier 102. The first structured metallization layer 106 comprises a plurality of pads 108 that are disposed on the dielectric layer 104 and are electrically isolated from one another. The pads 108 can be dimensioned to accommodate the mounting of one or more semiconductor dies 110 thereon. Separately or in combination, the pads 108 can be dimensioned to accommodate the mounting of passive elements, e.g., capacitors, resistors, inductors and the receptacles 112 disclosed herein. Separately or in combination, the pads 108 can form part of an electrical interconnect structure that connects two or more devices together. The layout shown in FIG. 1 illustrates just one of many potential configurations and, more generally, the size, shape and arrangement of the pads 108 may vary and be adapted to a particular application. The electronics carrier 102 may additionally comprise a second metallization layer 113 disposed on a rear side of the electronics carrier 102. The second metallization layer 113 may be a continuous layer that is used to thermally couple the electronics carrier 102 to a cooling apparatus, such as a heat sink. Generally speaking, the first structured metallization layer 106 and the second metallization layer 113 may comprise or be plated with any or more of Cu, Ni, Ag, Au, Pd, Pt, NiV, NiP, NiNiP, NiP/Pd, Ni/Au, NiP/Pd/Au, or Ni P/Pd/AuAg.

The semiconductor device assembly 100 comprises a plurality of dies 110 mounted on the pads 108 of the first structured metallization layer 106. The dies 110 may be mounted on these pads 108 using a conductive adhesive, e.g., solder, sinter, etc. Generally speaking, the semiconductor dies 110 can comprise a wide variety of device types, e.g., discrete devices, logic devices, custom circuits, controllers, sensing devices, passive elements, etc. According to an embodiment, at least some of the semiconductor dies 110 are configured as power devices. A power device refers to a type of semiconductor device that is rated to withstand high voltages, e.g., voltages of at least 100V (volts) and more typically on the order of 600V, 1,200V or more and/or is rated to withstand high currents, e.g., currents on the order of 1 A (amperes), and more typically on the order of 10 A, 50 A or more. Examples of power devices include discrete diodes and discrete transistors, e.g., MOSFETs, (metal-oxide semiconductor field-effect transistors), IGBTs (insulated gate bipolar transistors), HEMTS (high electron mobility transistors), etc. At least some of the semiconductor dies 110 may have a lateral device configuration wherein the device is configured to control a current flowing parallel to a main surface of the die. At least some of the semiconductor dies 110 may have a vertical configuration wherein the device is configured to control a current flowing vertically between the main surface of the die and a rear surface of the die.

The semiconductor device assembly 100 may form part of a power module. In particular, the power module may comprise the electronics carrier 102 with a plurality of the semiconductor dies 110 being power transistors that form the high-side switch and low-side switch of a half-bridge circuit. The power module may additionally comprise one or more of the semiconductor dies 110 being driver dies that control a switching operation of the half-bridge circuit. The power module may additionally include passive devices, e.g., capacitors, inductors, resistors, etc., mounted on the electronics carrier 102. Electrical interconnection between the various elements on the power electronics substrate may be effectuated using metal interconnect elements, e.g., clips, ribbons, bond wires, etc., that are soldered to the devices and/or metal pads. The power module may comprise a plastic housing that protects the various elements mounted on the electronics carrier 102.

The semiconductor device assembly 100 additionally comprises receptacles 112 that are affixed to the pads 108. The receptacles 112 are electrically conductive structures that form an electrical connection with the pads 108 and provide an anchoring mechanism for the insertion of press-fit connectors 114. The receptacles 112 are configured to be attached to the pads 108 using a conductive adhesive. For example, the receptacles 112 may comprise a substantially planar lower surface that faces the pads 108. A conductive adhesive, such as a solder, sinter or conductive glue may be used to attach the receptacles 112 to the pads 108. Generally speaking, the receptacles 112 can comprise any of a wide variety of electrically conductive metals, e.g., Cu, Ni, Ag, Au, Pd, Pt, etc., and alloys thereof.

The semiconductor device assembly 100 additionally comprises press-fit connectors 114. The press-fit connectors 114 are electrically conductive structures that are designed to be inserted in the receptacles 112. The press-fit connectors 114 may comprise a core of metal, e.g., Cu, Al, etc., and may comprise one or more layers of anticorrosion plating, e.g., Ni, Ag, Au, etc. The press-fit connectors 114 comprise mating features disposed at second ends 116 of the press-fit connectors 114 that are inserted into holes in the external electronics component. These mating features may be configured to plastically deform and/or may include a spring-loaded contact mechanism (as shown) to enhance I/O connectivity.

The combination of the receptacles 112 and the press-fit connectors 114 provides an electrical interconnect mechanism for electrically connecting the various components mounted on the electronics carrier 102 with an external electronics component (not shown), such as a PCB (printed circuit board) in a quick and reliable manner. The press-fit connectors 114 are electrically connected to the pads 108 via the receptacles 112. The receptacles 112 in turn are electrically connected to the various components mounted on the electronics carrier 102. For instance, one of the semiconductor dies 110 that is configured as a vertical device may be mounted on one of the pads 108, which in turn comprises a receptacle 112 and press-fit connector 114, thus providing a direct point of electrical contact to the rear surface terminal of the die 110. Alternatively, an upper surface terminal of the semiconductor dies 100 may be accessed by combinations of electrical interconnect elements and isolated ones of the pads 108 comprising the receptacle 112 and press-fit connectors 114 disposed thereon.

Figures 2, 2A, 2B, 2C:
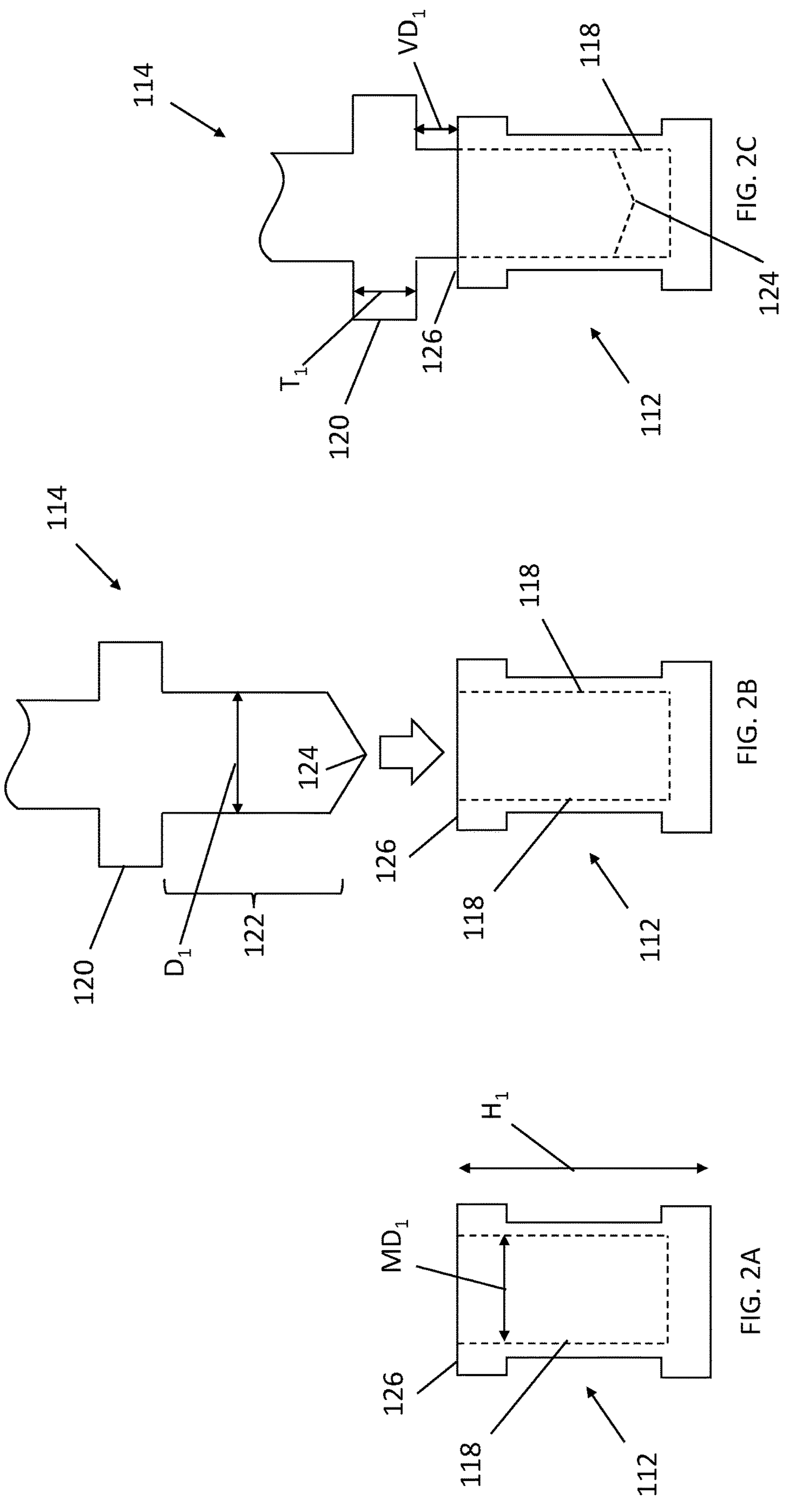
FIG. 2, which includes
FIGS. 2A, 2B, and 2C illustrates a close-up view of the insertion of a press-fit connector into a receptacle.

Referring to FIG. 2, a detailed view of the receptacle 112 and the lower part of the press-fit connector 114 that is inserted into the receptacle 112 is shown. The receptacle 112 comprises a sleeve 118 that receives the press-fit connector 114. According to an embodiment, the sleeve 118 has a cylindrical geometry, meaning that the interior sidewalls of the sleeve 118 have a circular shape from a plan-view perspective of the receptacle 112, and a diameter $D_1$ of the sleeve 118 is constant throughout the depth of the sleeve 118.

The press-fit connector 114 comprises a flange 120 and a base portion 122 extending from the flange 120 to a first end 124 of the press-fit connector 114. The flange 120 is a projection that extends transversely away from the press-fit connector 114. As can be seen in FIG. 2C, the flange 120 is arranged to extend over the upper end 126 of the receptacle 112 when the press-fit connector 114 is inserted in the receptacle 112. A thickness $T_1$ of the flange 120 has extending may generally be in the range of 500 μm and 2 mm. The thickness $T_1$ depend upon the material which forms the press-fit connector 114 and/or the receptacle 112, wherein a particular value is selected to have sufficient strength in the case of over-insertion of the press-fit connector 114, as will be described in further detail below. The flange 120 may have different geometries from a plan-view perspective of the press-fit connector 114. For instance, the flange 120 form a circular ring that projects outward from the base portion 122 of the press-fit connector 114 in every direction. Alternatively, the flange 120 may form two wings that extend outward from the base portion 122 in two opposite directions, while the press-fit connector 114 maintains a uniform thickness in a direction transverse to the extension of the wings.

The base portion 122 portion refers to the part of the press-fit connector 114 that extends from the flange 120 the first end 124 of the press-fit connector 114, wherein the first end 124 of the press-fit connector 114 is an opposite end from the second end 116 of the press-fit connector 114. As shown in FIG. 2C, the press-fit connector 114 can be arranged in a secured position whereby the base portion 122 is disposed within and securely retained by the receptacle 112. In the secured position, the press-fit connector 114 mechanically and electrically contacts the receptacle 112, and the base portion 122 acts as a mechanical anchoring mechanism that secures the press-fit connector 114 in place.

The base portion 122 of the press-fit connector 114 is configured to maintain a vertical separation distance $VD_1$ between the flange and an upper end of the receptacle in the secured position. The vertical separation $VD_1$ is a gap between the flange 120 and the upper end 126 of the receptacle 112. In the secured position as shown in FIG. 2C, the base portion 122 of the press-fit connector 114 contacts interior sidewalls of the sleeve 118 and prevents the flange 120 from being moved any closer to the upper end 126 of the receptacle 112. Stated another way, base portion 122 of the press-fit connector 114 presents a force threshold when the base portion 122 is inserted in the receptacle 112, wherein this force threshold must be overcome before the flange 120 may contact the upper end 126 of the receptacle 112.

According to an embodiment, the base portion 122 of the press-fit connector 114 is configured maintain the vertical separation distance $VD_1$ by a friction fit with the sleeve 118. That is, base portion 122 creates a friction barrier that resists any further downward movement of the press-fit connector 114 upon insertion.

According to an embodiment, the base portion 122 has a first diameter $D_1$, which can be a maximum diameter of the base portion 122, and is equal to or greater than a minimum diameter $MD_1$ of the sleeve 118. When the press-fit connector 114 is inserted into the receptacle 112 as shown in FIG. 2C, the outer surfaces of the base portion 122 contact the sidewalls of the sleeve 118. As shown, the cross-section of the base portion 122 having the first diameter $D_1$ extends into the sleeve 118, as the base portion 122 and the receptacle 112 engage and interact with one another such that friction force between the base portion 122 and the sidewalls of the sleeve 118 prevents the base portion 122 from moving any further past the vertical separation distance $VD_1$. The first diameter $D_1$ may be slightly larger than the minimum diameter $MD_1$ of the sleeve 118, e.g., within 101% and 105% of the minimum diameter $MD_1$ of the sleeve 118. This can cause the sleeve 118 to plastically deform during the insertion, thereby enhancing the friction fit. As shown, the base portion 122 may have a tapered region extending to the first end 124 of the press-fit connector 114. This tapered region may facilitate the insertion of the base portion 122 into a sleeve 118 that is smaller than the portion 122.

The base portion 122 may have different geometries that satisfy the requirement that the first diameter $D_1$ is equal to or greater than the minimum diameter $MD_1$ of the sleeve 118. For instance, the base portion 122 can have a conical geometry with a substantially uniform diameter equal to first diameter $D_1$ throughout a depth of the base portion 122. In another embodiment, the base portion 122 may comprise a transition between a lower portion wherein the diameter of the base portion 122 is less than the minimum diameter $MD_1$ and an upper portion wherein the base portion 122 has the first diameter $D_1$. The transition may be abrupt, e.g., step-shaped, or gradually sloping, for example. In another embodiment, the base portion 122 has a different geometry as the sleeve 118, an example of which will be described in further detail below with reference to FIG. 4. In another example, the interior sidewalls of the sleeve 118 may comprise projections or shelf structures that mechanically engage with corresponding projections and/or recesses in the base portion 122. Separately or in combination, the material composition of the interior sidewalls sleeve 118 and/or the base section 122 may be tailored to create or enhance the mechanical stopping. For instance, one or both of these structures may be coated with a metal that enhances friction when the interior sidewalls sleeve 118 and the base section 122 contact one another.

The press-fit connector 114 comprising the base portion 122 being configured to maintain the vertical separation distance $VD_1$ has the following advantages. The configuration of the base portion 122 allows for the press-fit connector 114 to be maintained in a mechanically stable position during assembly steps, while preventing the flange 120 from acting as a stopping mechanism during these assembly steps. These assembly steps may comprise die attach, soldering, wire bonding, encapsulation, etc. As the electronics carrier 102 is moved by processing equipment through various processing steps, alignment and position of the press-fit connector 114 is maintained. With the base portion 122, the flange 120 provides a secondary stopping mechanism which acts as a fail-safe in the event of over-insertion, e.g., in the case that device is mated with a printed circuit board and excessive insertion force is applied to the press-fit connector 114. By way of comparison, in a configuration does not maintain the vertical separation distance $VD_1$, the flange 120 may rest during directly on the upper end 126 of the receptacle during these assembly steps, as it provides the only stopping mechanism. In that case, the press-fit connector 114 can move and/or become misaligned due to leeway between the sleeve 118 and the base portion 122. Moreover, as between multiple ones of the press-fit connectors 114, the vertical position of the second end 116 may vary, due to tolerance windows.

The inventors have observed that the following dimensional relationships provide the beneficial alignment and mechanical securing of the press-fit connector 114 described above. According to an embodiment, in absolute terms, the vertical separation distance $VD_1$ between the flange 120 and the upper end 126 of the receptacle 112 in the secured position between 50 μm and 500 μm. In a more particular embodiment, the vertical separation distance VD1 may be between 200 μm and 300 μm. Separately or in combination, the vertical separation distance $VD_1$ may be correlated to the overall height $H_1$ of the receptacle 112. According to an embodiment, a ratio between the vertical separation distance $VD_1$ between the flange 120 and the upper end 126 of the receptacle 112 and the overall height overall height $H_1$ of the receptacle 112 is between 1:100 and 1:5. In a more particular embodiment, the ratio between the vertical separation distance $VD_1$ between the flange 120 and the upper end 126 of the receptacle 112 and the overall height overall height $H_1$ of the receptacle 112 is between 2:25 and 3:25.

Figures 3, 3A, 3B, 3C, 3D, 3E:
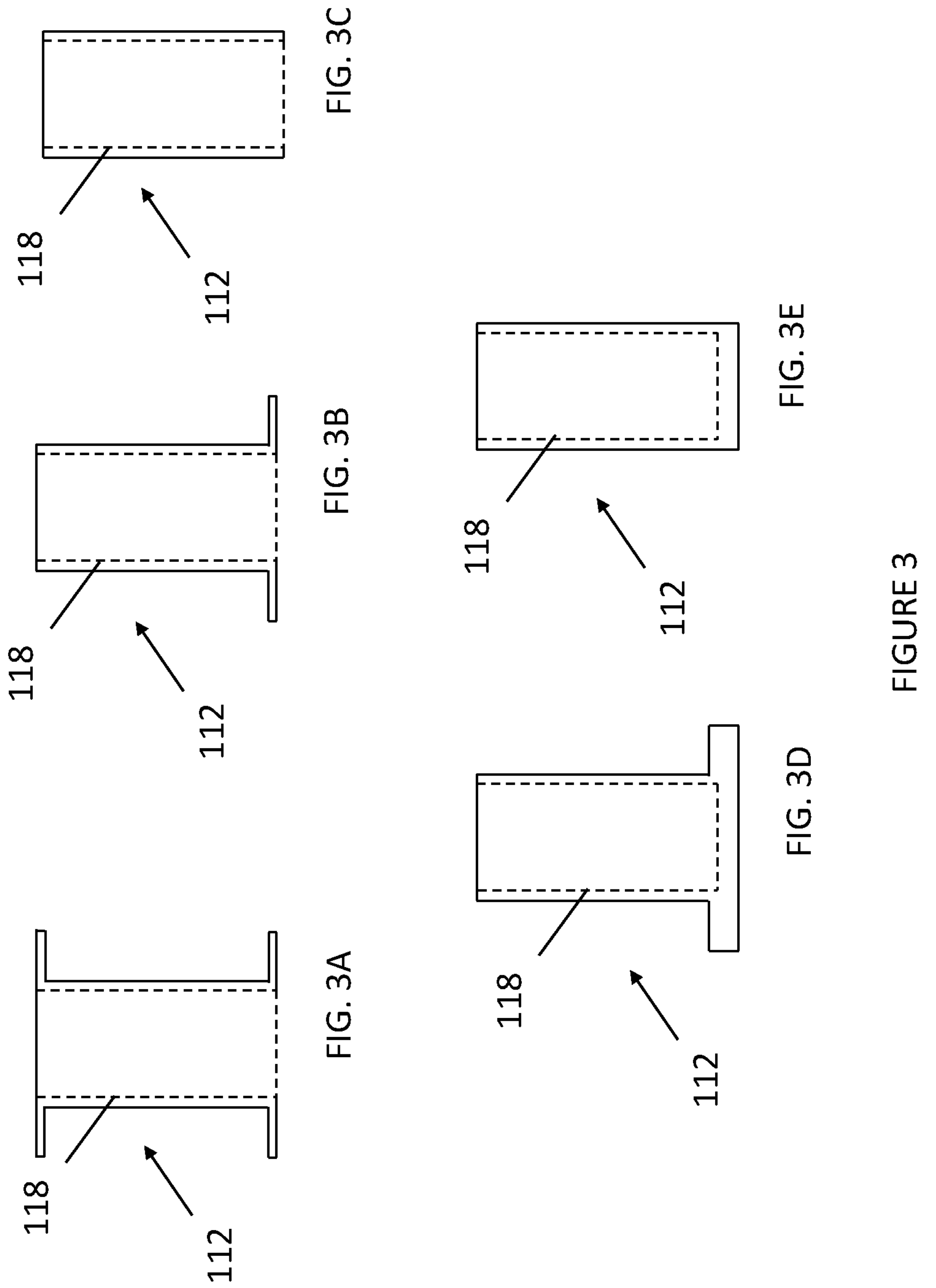
FIG. 3, which includes
FIGS. 3A, 3B, 3C, 3D and 3E, illustrates receptacles that may be used with the press-fit connector, according to various embodiments.

Referring to FIG. 3, various configurations of the receptacle 112 are shown. The receptacles 112 represent different possible configurations of a receptacle 112 that may be attached to the electronics carrier 102 and provide an anchoring mechanism for the insertion of press-fit connectors 114 in the above-described manner. As can be seen, the receptacles 112 may be configured such that the receptacle 112 extends completely through to a bottom side of the receptacle 112, e.g., as shown in the embodiments of FIGS. 3A-3C. Separately or in combination, the flange-like structures many be omitted from one or both of the bottom side and top side of the receptacle 112, e.g., as shown in the embodiments of FIGS. 3B-3E.

Figure 4:
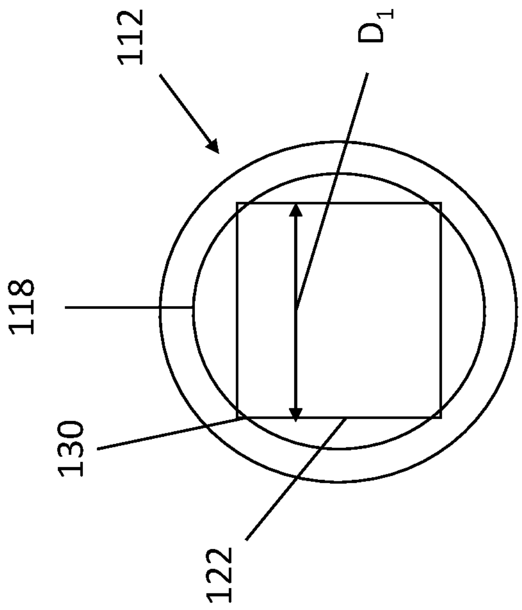
FIG. 4 illustrates a plan-view schematic of a press-fit connector inserted into a receptacle, according to an embodiment.

Referring to FIG. 4, an embodiment wherein the base portion 122 has a different geometry as the sleeve 118 is shown. More particularly, the receptacle 112 has a cylindrical geometry, and the base portion 122 has a rectangular geometry. The base portion 122 can be dimensioned such that edges 130 of the base portion 122 contact and engage with the interior sidewalls of the sleeve 118 upon insertion through proper selection of the first diameter $D_1$. This concept is more generally applicable to any configuration wherein the base portion 122 has a polygonal geometry with acute edges that engage with the sleeve 118 upon insertion.

Referring to FIG. 5, an embodiment wherein the electronics carrier 102 comprises an electrically conductive lead frame is shown. As shown in FIG. 5A, the semiconductor dies 110 are mounted on a die pad 132 portion of the lead frame. The lead frame may additionally comprise a plurality of leads 134 that are spaced apart from the die pad 132. Electrical interconnectors such as bond wires, clips etc. (not shown) may be used to effectuate electrical connections between the semiconductor dies 110 and the leads 134. The electronics carrier 102 configured as a lead frame can be provided from a substantially uniform thickness sheet of conductive metal such as copper (Cu), aluminium (Al), nickel (Ni), nickel phosphorous (NiP), silver (Ag), palladium (Pd) gold (Au), etc., alloys or combinations thereof. The receptacles 112 are affixed to the die pad 132 portion of the lead frame. In other embodiment, the receptacles 112 can be affixed to other pad portions of the lead frame, including landing pad portions of the leads 134. Referring to FIG. 5B, the press-fit connectors 114 can be arranged within the receptacles 112 in the same manner described above. Subsequently, an encapsulation process can be performed to form an encapsulant body comprising, e.g., mold compound, epoxy, thermosetting plastic, etc. In this example, the press-fit connectors 114 can be provided in addition to or in substitution of some of the leads 134.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device assembly, comprising:

an electronics carrier;

an electrically conductive receptacle attached to a first pad of the electronics carrier; and an electrically conductive press-fit connector comprising a flange, a base portion extending from the flange to a first end of the press-fit connector, and a second end opposite from the first end;

wherein the press-fit connector is in a secured position whereby the base portion is disposed within and securely retained by the receptacle, and wherein the base portion of the press-fit connector is configured to maintain vertical separation between the flange and an upper end of the receptacle in the secured position, wherein in the secured position the second end of the electrically conductive press-fit connector is exposed.

2. The semiconductor device assembly of claim 1, wherein the electronics carrier comprises a structured metallization layer, and wherein the structured metallization layer comprises the first pad.

3. The semiconductor device assembly of claim 1, wherein the electronics carrier comprises an electrically conductive lead frame, the lead frame further comprising the first pad.

4. The semiconductor device assembly of claim 1, wherein the receptacle comprises a sleeve mechanically and electrically connected to an upper surface of the first pad, and wherein the base portion of the press-fit connector is configured to maintain the vertical separation by a friction fit with the sleeve.

5. The semiconductor device assembly of claim 4, wherein the base portion has a first diameter, and wherein the first diameter is equal to or greater than a minimum diameter of the sleeve.

6. The semiconductor device assembly of claim 4, wherein the receptacle has a cylindrical cross-sectional geometry, and wherein the base portion has a polygonal cross-sectional geometry, and wherein edges of the base portion engage with the sleeve to provide the friction fit.

7. The semiconductor device assembly of claim 1, wherein the vertical separation distance between the flange and the upper end of the receptacle in the secured position is between 50 μum and 500 μm.

8. The semiconductor device assembly of claim 7, wherein the vertical separation distance between the flange and the upper end of the receptacle in the secured position is between 200 μm and 300 μm.

9. The semiconductor device assembly of claim 1, wherein a ratio between the vertical separation distance and the overall height of the receptacle is between 1:100 and 1:5.

10. The semiconductor device assembly of claim 9, wherein the ratio between the vertical separation distance and the overall height of the receptacle is between 2:25 and 3:25.

11. The semiconductor device assembly of claim 1, further comprising a first semiconductor die mounted on the electronics carrier, wherein the press-fit connector is electrically connected to a terminal of the first semiconductor die via the receptacle and the first pad of the structured metallization layer.

12. The semiconductor device assembly of claim 11, wherein the first semiconductor die is a power device, and wherein the electronics carrier is any one of: a DCB substrate, an IMS substrate, or an AMB substrate.

13. The semiconductor device assembly of claim 1, wherein the press-fit connector comprises a mating feature disposed at the second end of the press-fit connector.

14. The semiconductor device assembly of claim 13, wherein the mating feature is a spring-loaded contact mechanism.

15. An electronics carrier interconnection system, comprising:

an electrically conductive receptacle that is configured to be affixed to an electronics carrier;

an electrically conductive press-fit connector comprising a flange and a base portion extending from the flange to a first end of the press-fit connector;

wherein the press-fit connector is configured to be mechanically and electrically connected to the receptacle in a secured position whereby the base portion is disposed within and securely retained by the receptacle, wherein the base portion of the press-fit connector is configured to maintain vertical separation between the flange and an upper end of the receptacle in the secured position, and wherein in the secured position the second end of the electrically conductive press-fit connector is exposed.

16. The electronics carrier interconnection system of claim 15, wherein the base portion that has a first diameter, and wherein the first diameter is equal to or greater than a minimum diameter of the sleeve.

17. The electronics carrier interconnection system of claim 15, wherein the receptacle has a cylindrical cross-sectional geometry, and wherein the base portion has a polygonal cross-sectional geometry, and wherein edges of the base portion engage with the sleeve to provide the friction fit.

18. The electronics carrier interconnection system of claim 15, wherein the vertical separation distance between the flange and the upper end of the receptacle in the secured position is between 50 μm and 500 μm.

19. The electronics carrier interconnection system of claim 15, wherein the press-fit connector comprises a mating feature disposed at the second end of the press-fit connector.

20. The electronics carrier interconnection system of claim 19, wherein the mating feature is a spring-loaded contact mechanism.

* * * * *